July 21, 1936.    H. C. BARNES    2,048,052
METER FOR RECORDING ELAPSED TIME
Filed May 29, 1934
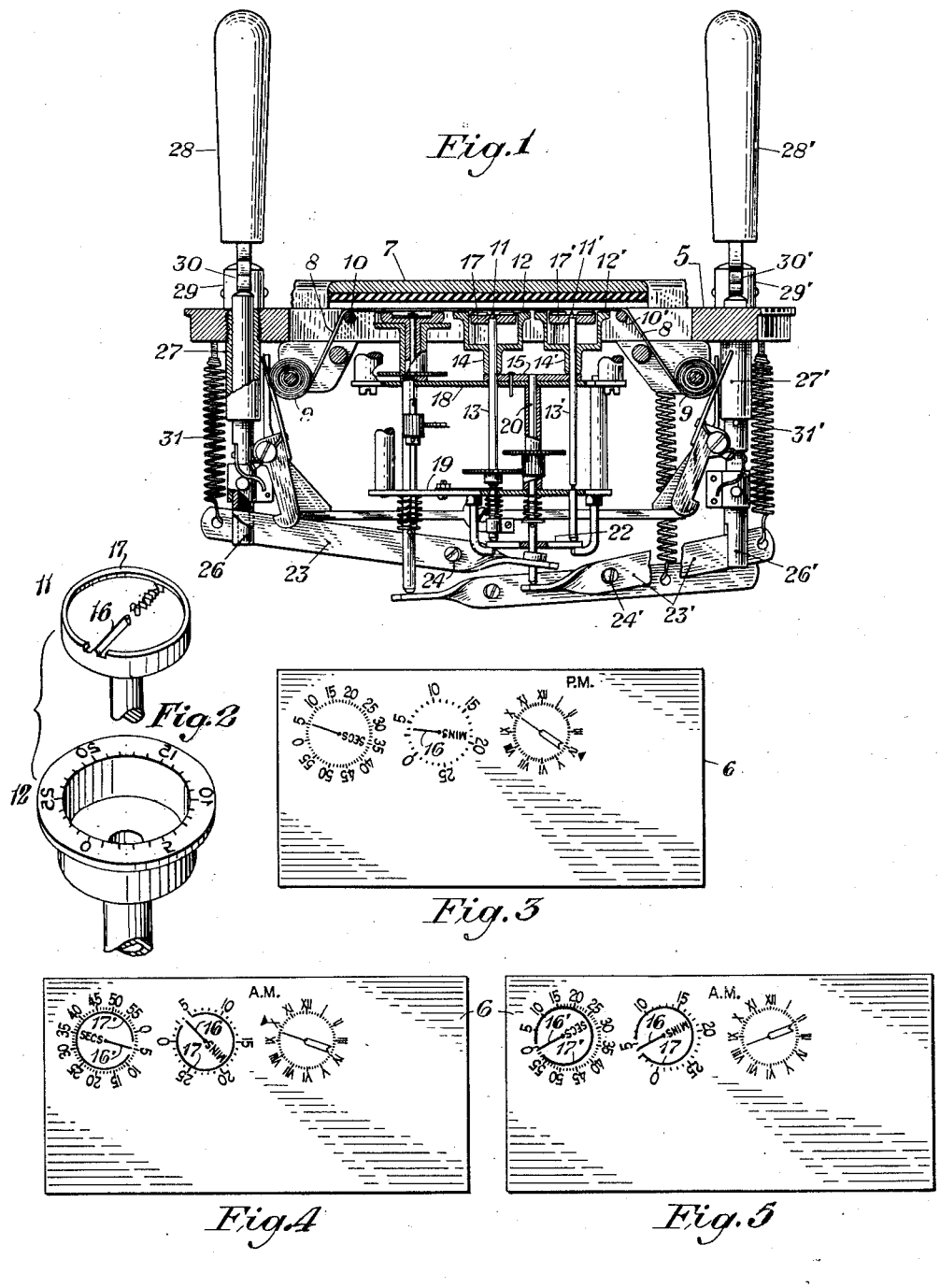
INVENTOR
H. C. Barnes
BY
ATTORNEY Patented July 21, 1936

2,048,052

UNITED STATES PATENT OFFICE 2,048,052

METER FOR RECORDING ELAPSED TIME

Howard Charles Barnes, Westfield, N. J., assignor to American Telephone and Telegraph Company, a corporation of New York Application May 29, 1934, Serial No. 728,189

3 Claims. (Cl. 234—54)

This invention relates to printing meters, and more particularly to meters for recording elapsed time.

In the use of certain types of meters for measuring elapsed time, it is customary to insert a ticket in the meter to obtain an impression thereon of a continuously rotating dial having a graduated scale of units arranged about its periphery. Within this dial is positioned a pointer rotating on the axis of and with the dial. At the end of the interval to be measured, the ticket is again inserted in the meter and an impression obtained of the pointer which has rotated and moved through a certain arc with respect to the impression previously made by the dial. The imprint of the pointer in conjunction with the imprint of the graduated dial indicates the time elapsed. It is necessary that the ticket upon being reinserted in the meter be properly registered with respect to the first impression in order to obtain a true indication of the elapsed time.

It is an object of this invention to provide an improved meter of the above character to readily indicate if the ticket has been properly registered with respect to the first and second impressions, in order to record a true indication of elapsed time.

A further object is to readily detect and accurately determine by the eye the amount of elapsed time between the first and the second insertions of the ticket in the meter, as shown by the record printed on the ticket in accordance with this invention.

These and further objects will be apparent from the following description, when considered in connection with the accompanying drawing, in which one embodiment of the invention is illustrated.

Referring to the drawing, Figure 1 is a sectional view of the improved device; Fig. 2 is an enlarged perspective view of one set of dies shown in separated relation; Fig. 3 illustrates a printed side of a ticket showing by the pointers the amount of time elapsed in accordance with recording conditions formerly employed; Fig. 4 illustrates a like view of a ticket showing a printed record of elapsed time as made by the printing meter of this invention when the ticket has been correctly placed in the meter both at the start and at the completion of the interval of time to be measured; and Fig. 5 is a view similar to Fig. 4 showing the printed record on a ticket which has been improperly positioned in the meter either at the start or at the completion of the interval of time to be measured.

In the drawing in which like characters of reference designate like parts throughout, there is shown a base plate 5 upon which a ticket 6 to be printed is supported. An overhanging abutment plate 7 equipped with a platen is carried by the base plate and the ticket is forced against this plate by pressure of dies, to be presently described. The ticket is inserted beneath the abutment plate and pushed back until it strikes the rear edge thereof and is guided into position with the end of the ticket meeting the ticket stop 7'. The printing dies are raised from below and impinge upon an ink ribbon 8, which is interposed between the dials and the ticket. The ends of the ribbon 8 are secured to spools 9, 9 which are suitably mounted in bearings carried by a frame. The ribbon travels between the spools 9, 9 over rollers 10, 10 and passes upwardly through slots in the base plate. Any suitable means may be provided to cause the ribbon to be drawn off one spool and wound upon the opposite spool.

The meter embodying this invention is adapted to record elapsed time and is shown as having three printing dies which are similar in principle, one set being used for the purpose of recording the time of day, and since it has no bearing on this invention, no further mention of it will be made in this description. Of the other two sets of dies embodied in this invention for recording elapsed time, one set records the time in values of minutes and the other set records time in values of seconds. Each set consists of an outer member and an inner member which rotate in unison, but may be raised independently of each other. The outer member of both sets of dies is operated at the beginning of an interval of elapsed time to be measured, and the inner member of both sets at the close of such interval.

One set of dies for recording the value of minutes include a pointer die 11 of circular form and an annular dial die 12 having division marks engraved thereon. The pointer die is mounted on the upper end of an arbor 13, while the dial die is carried on a cup 14 that is slidably mounted upon the arbor 13 and rests upon a vertically movable plate 15. The pointer die 11, in addition to having a pointer 16 engraved thereon, also has a ring 17 engraved about its periphery which lies in concentric relation to the division marks appearing about the periphery of the annular die 12. This ring has a broken away portion for a distance on either side of the outer end of the pointer, and the pointer and ring rotate together in this relation. The circular die 11 positioned within the opening in the annular die 12, rotates in unison with the annular die so that the pointer on the die 11 registers with the "0" division mark on the annular die. In making an impression of the annular member of the die at the beginning of the interval to be measured, and the inner member or pointer die at the termination of the period, there is a relative displacement between the location of the "0" mark on the graduated dial and the end of the pointer on the pointer dial due to the continuous rotation of both dies in unison. The division mark on the imprint of die 12 which registers with the imprint of the pointer on die 11 at the termination of the time interval indicates the minutes elapsed. The broken away portions of the ring 17 lying a distance from the outer end of the pointer, enables the eye to more accurately gauge the particular division mark indicated by the pointer. It will be apparent from an examination of the ticket appearing in Fig. 4, which is a reproduction of the printing made by the dies just described, that the particular division mark with which the pointer registers at the termination of the time to be measured can be clearly observed and a true indication of the elapsed time can be accurately determined. This accuracy will be obvious when the elapsed time record shown on the ticket appearing in Fig. 4, which is a reproduction of a record made by the improved meter embodied in this invention, is compared with the record appearing in Fig. 3, which is a reproduction of a record obtained from printing by meters formerly in use. Should the ticket 6 be positioned incorrectly upon being replaced in the meter, the imprint made by the ring 17 on the ticket will not be concentric to the imprint of the division marks about the annular die 12 which were made upon the initial positioning of the ticket in the meter. The record made upon the ticket under this condition is shown in Fig. 5 of the drawing. This incorrect positioning of the ticket can be quickly detected. The corresponding parts of the other set of dies which are for recording the value of elapsed time in seconds are designated in the same manner as the parts relating to the minute dies, except that the reference characters are primed. The arbors have bearings in frame plates 18 and 19. The plate 15 is secured to the upper end of a rod 20 which is vertically movable in bearings in said frame plates. The rod 20 rests on the lever 23' by which it is vertically moved for printing the two dial dies. The arbors 13 and 13' rest upon a disk 22 that is slidably mounted upon the rod 20 and said disk can be raised by the lever 23 for the purpose of printing the pointers and circle 17. Springs are mounted on the arbors for the purpose of tending to keep them in lowered positions, and a spring is also mounted on the vertical rod 20 to tend to keep the dials in lowered position. The lever 23 is fulcrumed on the screw 24 on a suitable frame (not shown) depending from the base plate. The inner end of the lever raises the printing die, and its outer end is depressed for that purpose by a rod 26 having a slot in its lower end which straddles the said lever. The said rod is slidably mounted in a sleeve 27 which is secured to the base plate. A hand lever 28 is fulcrumed on a pin 29 that is secured in a stud mounted on the base plate, and said lever has an arm 30 on its front side which contacts with and serves to depress the upper end of said rod, and a shoulder on the rear side (not shown) contacts with the base plate and limits the backward movement of said lever. A spring 31 is secured to the base plate and to the outer end of said lever 23 and tends to elevate said lever and also said rod, and to hold the hand lever 28 in its backward position. On the opposite side of the machine are parts for operating the other printing die which parts correspond to those just described, and are designated by the same reference characters except that they are primed.

A clock mechanism and gearing (not shown) are provided for rotating the two sets of dies at a uniform rate. In recording the elapsed time by means of the meter of this invention, a card or ticket 6 at the beginning of an interval of time is placed against the guides in the meter in order to hold it in a fixed position relative to the dies, and the dial dies or printing plates are elevated by movement of the right hand handle 28', and the annular members of the two sets of dies are printed upon the card in whatever phase of rotation the dials may then happen to occupy. At the end of the interval of elapsed time to be measured, the card or ticket is replaced against the guides in the original position and the pointers and associated rings are printed by movement of the handle 28. When the dials were printed, the pointer dies were, as always, at "0" on the dial dies and, consequently, at the moment of the imprinting of the dial dies, the pointer dies were at "0" on the imprints. During the interval of elapsed time, the pointer dies travel in unison with the dial dies and rotate through a certain arc with respect to the imprint of the dial dies on the card or ticket. Consequently, when the pointer dies are printed at the end of an interval of elapsed time, their imprints point to the graduations on the dial imprints which represent the value of the arc through which the pointers have traveled from the "0" imprint during the interval of time. Thus, the pointers will register with the particular division marks and indicate on the ticket the interval of elapsed time in minutes and seconds. Such an imprint made at the beginning of the period of elapsed time and also the final imprint is shown in Fig. 4. As previously pointed out, the rings associated with the pointers will also appear on the final imprint on the ticket, and when these rings appear in concentric relation with the imprint of the division marks on the annular die, as shown in Fig. 4, it will indicate that the ticket has been properly positioned in the meter both at the start and at the termination of the interval of time to be measured. A true reading of the elapsed time is thus assured. The arrangement of the outer ends of the pointers lying within the broken away portion of the circle will enable the reading to be easily determined. Should the ticket be improperly positioned in the meter either at the start or at the termination of the period of time to be measured, the imprint of the pointer and associated ring will not appear in concentric relation with the imprint of the graduated marks on the annular die, but will appear instead in eccentric relation thereto as shown on the ticket illustrated in Fig. 5. The eccentricity of the imprint of the pointer die with respect to the imprint of the annular die may be readily detected by the eye. By taking into account the amount of eccentricity it is possible to make proper correction and obtain an accurate reading of the elapsed time.

What is claimed is:

1. In a recording mechanism, a printing member having a surface provided with a scale formed as raised portions for making impressions, a co-operating member proximate to said first member, said second member formed with an interrupted raised flange and an index member extending into said interrupted part of said flange, said index and said flange being formed for making impressions in co-operative reading relation with the impressions formed by said scale.

2. In a recording mechanism, a circular printing member having a surface provided with a scale about its periphery, said scale being formed as raised portions for making impressions, a co-operating member circular in form and arranged proximate to said first member, said second member formed with an interrupted raised flange and an index member extending into said interrupted part of said flange, said index and said flange being formed for making impressions in co-operative reading relation with the impressions formed by said scale.

3. In a recording mechanism, a printing member circular in form and provided with a circular opening, said circular member having a surface provided with an annular scale adjacent said opening, said scale formed as raised portions for making impressions, a co-operating member circular in form and arranged within said opening proximate to the scale of said first member, said second member formed with an interrupted raised flange about its outer periphery and an index member extending into said interrupted part of said flange, said index and said flange being formed for making impressions in co-operative reading relation with the impressions formed by said scale.

HOWARD C. BARNES.